United States Patent [19]

Kessler

[11] 4,137,637
[45] Feb. 6, 1979

[54] CARPENTER'S PORTABLE PRECISION ADJUSTABLE LENGTH CUTTING GAUGE

[76] Inventor: Wilbur Kessler, 3621 Boyd St., Midland, Tex. 79703

[21] Appl. No.: 845,552

[22] Filed: Oct. 26, 1977

[51] Int. Cl.² ............................................. B43L 7/06
[52] U.S. Cl. ............................................. 33/94
[58] Field of Search ............................ 33/93–95, 33/75, 97; 83/454, 574, 743, 745, 827, 829; 145/129

[56] References Cited

U.S. PATENT DOCUMENTS

| | | | |
|---|---|---|---|
| 1,911,045 | 5/1933 | Tinnen | 83/454 |
| 2,735,455 | 2/1956 | Frosberg | 83/574 X |
| 2,772,707 | 12/1956 | Leino | 33/95 X |
| 3,124,176 | 3/1964 | Vogini | 83/574 X |
| 3,827,326 | 8/1974 | Martin | 83/574 X |

Primary Examiner—Charles E. Phillips
Attorney, Agent, or Firm—J. Gibson Semmes

[57] ABSTRACT

An adjustable and portable miter gauge characterized by an elongated workpiece engaging angle iron made of aluminum, terminating at one end with a power saw guide which is angularly adjustable, relative to the angle iron and a workpiece stop block contained by the angle iron, setting the workpiece relative to the guide for handy and successively accurate sawing without the necessity for measurement and pencil mark or the use of precut workpiece as pattern such as might cause discrepancies in measurement from the sawing of one workpiece to another.

2 Claims, 4 Drawing Figures

CARPENTER'S PORTABLE PRECISION ADJUSTABLE LENGTH CUTTING GAUGE

THE PRIOR ART

The prior art is known to be represented by the following U.S. Pat. Nos.: 1,459,873 Blackburn, 2,822,834 Hammers, 1,700,189 Wikstrom, 2,942,633 King, 2,651,333 Spinney, 3,320,982 Kwiatkowski, 2,661,034 MacDonald, 3,869,951 Litwin, 2,735,455 Forsberg, 3,874,261 Murray, 2,735,456 Grier et al, 3,903,774 Stinson.

Whereas a substantial amount of effort in carpentry has been undertaken to design guides for hand power saws and the like, the prior art appears best represented by the patents to Blackburn and Spinney. The Blackburn invention is distinguishable on the basis that it comprises an adjunct to a saw table. The Spinney invention is likewise lacking in any means for adjustably and portably effecting the location of the workpiece. The remainder of the art, while related, does not comprehend the coactive elements found in the ensuring description and drawings depicting the within invention. In short, conventional guides for saws are well known but the combination of a workpiece engaging and setting member, coactively disposed with respect to a power saw guide which may be present, angularly of the workpiece is novel.

DESCRIPTION OF THE INVENTION

Figure 1:
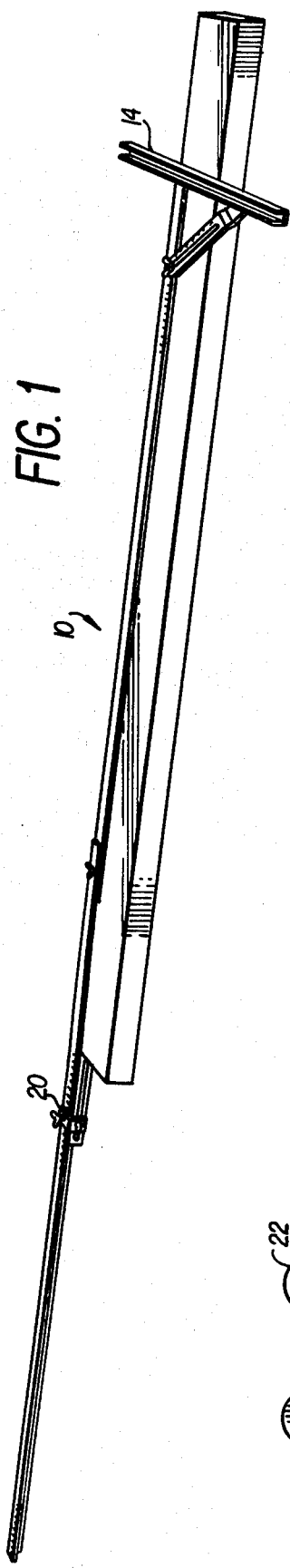
FIG. 1 is a view in perspective of invention showing its working relationship to a workpiece.
Figure 2:
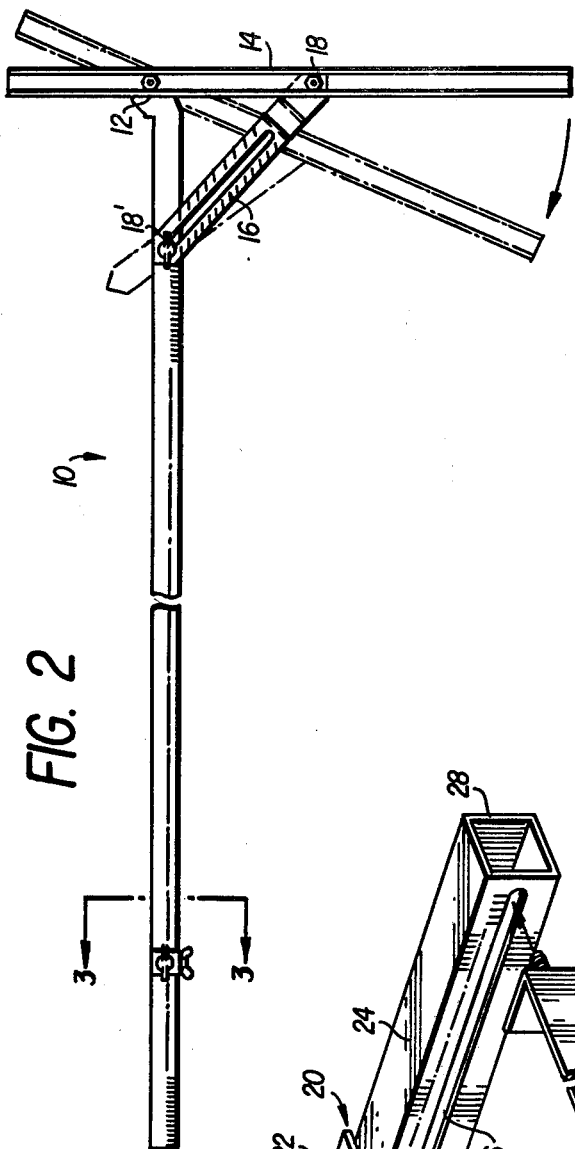
FIG. 2 is a top plan view of invention, showing angular disposition of the guide relative to the workpiece engaging member.

The miter gauge shown in FIG. 1 comprises an angled aluminum extrusion 10 having at an end 12 a power saw engaging guide 14, said guide being pivotally mounted relative to the end 12 of the gauge and having at a spaced distance from the pivot means for rotatably mounting a connecting arm 16, relative to the angle iron by means of the locknut 18'. It will be noted that the connecting arm 16 is, by means of the enlongated aperture, slidable relative to the angle iron 10. See FIG. 2. The extrusion 10 is calibrated lineally in either metric or conventional increments of inches or centimeters or fractions thereof to designate the desired length of workpiece to be cut; whereas the arm 16 is calibrated in degrees to denote the angular position of the guide 14, relative to the workpiece and/or overlying angled extrusion 10.

Figure 3:
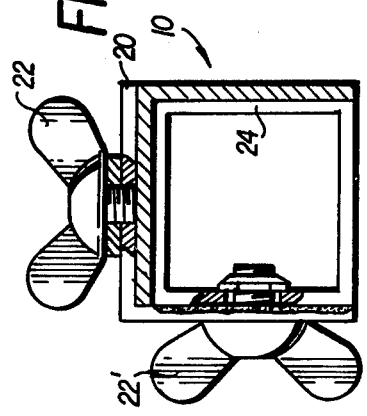
FIG. 3 is a view in vertical section of the adjustable abutment means, defined hereinafter, reference FIG. 2 aforesaid.
Figure 4:
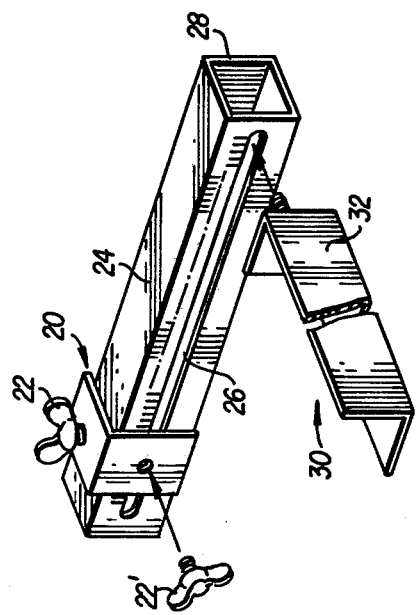
FIG. 4 is an enlarged isometric view of the abutment means illustrated in FIG. 1-3 inclusive.

Marker and precision setting means 20 abutting the workpiece, are depicted in the FIGS. 3 and 4. It will be noted with reference to FIG. 1 that the angle iron 10 includes vertical and horizontal flanges which are basically adapted to engage the workpiece at a corresponding upper corner edge thereof. The horizontal and uppermost flange of the angle iron 10 makes contiguous contact with an overlapping measuring marker 20 on the one side and the abutment slide 24 on the other side.

Set screws 22 and 22' of the marker 20 removeably engage corresponding portions of the horizontal flange of the angle iron, on the one hand and the elongated aperture 26 of the abutment slide 24 on the other hand. Extension 30 of the slide serves as a workpiece engaging member to further steady the same against displacement during the course of operation of the device as in measuring for sawing. The forward flat face 32 of the extension lies in the same plane as a line drawn across the open face 28 of slide 24. It will be appreciated that the adjustable moveability of slide 24, relative to the marker 20, is to compensate for the flat workpiece engaging plane of the hand power saw wherein they are known to vary in width from tool to tool. Thus as the marker 20 may be set at a specified distance, viz 36 from the marking extremity of the guide 14, the workpiece must be displaced a distance which is equivalent to the width of the flat plane of the cutting tool, in order that the workpiece may accurately reflect the true measurement. Lineal calibrations of small increments, viz: ⅛, are embossed upon the slide 24 to accommodate the width of the plane of the cutting tool and assure accurate workpiece length, relative to the setting on the angled element 10. In practice, the device may be used to guide a saw in the precision production of multiple dimension lumber. Conventional setup or tear down time is eliminated. Examples of the utility of the length cutting gauge are as in the construction of a home during build up and before framing as follows: to cut trimmers; to cut all the window and door headers; the cripples including short jack rafters; to cut lookouts and hanger blocks below the eaves or gables and to cut the rafters for a pan ceiling, also the cutting of gable studs.

A typical cutting gauge of the present invention would comprise the following construction dimensions. The angled extrusion 10, composed of two telescoping elements of 4 feet 3 inches each, joining in a 6 inches overlapping connection, the entire to be fabricated of a 5/16 inch thick extrusion. The marker 20 of such an instrument would be 6 inches in length and its connected extension 30 is 5 inches in length, end to end.

I claim:

1. In the art of carpentry through the use of hand-powered cutting tools, a portable elongated cutting gauge which is conformable to a workpiece of rectangular dimensions, the elements comprising in relative coactive relationship;

(A) an elongated and graduated extruded aluminum rule formed of connected vertical and horizontal flanges, said flanges being adapted to engage corresponding vertical and horizontal portions of a workpiece;

(B) a two-sided precision marker, one side of which lies contiguous and coplanar with the top of the horizontal flange of the rule and which is settable in overlying relation to the rule, the other side of the marker depending vertically opposite the vertical flange of the rule, said marker bearing a first setting means which is engageable with the horizontal flange of the rule;

(c) an adjustable elongated workpiece stop block, mounted contiguous the inside of the vertical and horizontal flanges of the rule, said stop block and said marker mounting a second setting means to place the stop block in adjustable contact with the marker, said stop block being independently moveable relative to the rule; and (D) an angular guide for the saw, swivel mounted between its ends and at one end of the rule and an adjustably graduated arm thereon, connecting guide and rule for presetting the angle of the guide relative to the rule and the marker.

2. The apparatus according to claim 1, wherein the stop block supports an extension at an end thereof whereby to increase the abutment area of the contiguous stabilization of the workpiece.

* * * * *